(12) United States Patent
Sun

(10) Patent No.: US 8,657,902 B2
(45) Date of Patent: Feb. 25, 2014

(54) APPARATUSES FOR SEPARATING CATALYST PARTICLES FROM AN FCC VAPOR

(75) Inventor: Bing Sun, South Barrington, IL (US)

(73) Assignee: UOP LLC, Des Plaines, IL (US)

( * ) Notice: Subject to any disclaimer, the term of this patent is extended or adjusted under 35 U.S.C. 154(b) by 23 days.

(21) Appl. No.: 13/330,455

(22) Filed: Dec. 19, 2011

(65) Prior Publication Data
US 2013/0152523 A1    Jun. 20, 2013

(51) Int. Cl.
*B01D 45/12* (2006.01)

(52) U.S. Cl.
USPC ............... 55/345; 55/459.5; 55/460; 55/451; 422/144; 422/147

(58) Field of Classification Search
USPC .......... 55/459.5, 460, 451, 345; 422/144, 147
See application file for complete search history.

(56) References Cited

U.S. PATENT DOCUMENTS

| | | |
|---|---|---|
| 4,572,780 A | 2/1986 | Owen et al. |
| 4,714,541 A | 12/1987 | Buyan et al. |
| 4,731,228 A | 3/1988 | Dewitz et al. |
| 5,126,036 A | 6/1992 | Owen |
| 5,190,650 A * | 3/1993 | Tammera et al. ............. 210/256 |
| 7,156,902 B1 | 1/2007 | Altman |

FOREIGN PATENT DOCUMENTS

RU     2174143 C2    10/1999

* cited by examiner

*Primary Examiner* — Dung H Bui
(74) *Attorney, Agent, or Firm* — James C Paschall

(57) ABSTRACT

Apparatuses for separating solid catalyst particles from a Fluid Catalytic Cracking (FCC) vapor are provided. In one embodiment, an apparatus includes a vessel formed with a vessel wall. A conduit is positioned within the vessel and is configured to direct flow of an FCC vapor-solid stream. The apparatus also includes a channel positioned within the vessel and in fluid communication with the conduit. The channel has a channel inlet with an inlet cross-sectional area and a channel outlet with an outlet cross-sectional area less than about 75% of the inlet cross-sectional area. The channel outlet is configured to direct the vapor-solid stream tangentially toward the vessel wall to separate the solid catalyst particles from the FCC vapor.

20 Claims, 3 Drawing Sheets

APPARATUSES FOR SEPARATING CATALYST PARTICLES FROM AN FCC VAPOR

TECHNICAL FIELD

The present invention generally relates to apparatuses for the fluidized catalytic cracking (FCC) of heavy hydrocarbon streams, and more particularly relates to apparatuses for separating catalyst particles from FCC vapor streams during FCC processing.

BACKGROUND

The fluidized catalytic cracking of hydrocarbons is a foundational process in the production of gasoline and light hydrocarbon products from heavy hydrocarbon charge stocks such as vacuum gas oils or residual feeds. Large hydrocarbon molecules, associated with the heavy hydrocarbon feed, are cracked to break the large hydrocarbon chains thereby producing lighter hydrocarbons. These lighter hydrocarbons are recovered as product and can be used directly or further processed to raise the octane barrel yield relative to the heavy hydrocarbon feed.

The basic equipment or apparatus for the fluidized catalytic cracking of hydrocarbons has been in existence since the early 1940s. The basic components of the FCC process include a reactor, a regenerator, and a catalyst stripper. The FCC process is carried out by contacting the starting material, whether vacuum gas oil, reduced crude, or another source of relatively high boiling hydrocarbons, with a catalyst made up of a finely divided or particulate solid material. The reactor includes a contact zone where the hydrocarbon feed is contacted with the particulate catalyst and a separation zone where product vapors from the cracking reaction are separated from the catalyst. Further product separation takes place in a catalyst stripper that receives catalyst from the separation zone and removes entrained hydrocarbons from the catalyst by counter-current contact with steam or another stripping medium. The catalyst is transported like a fluid by passing vapor through it at sufficient velocity to produce a desired regime of fluid transport. Contact of the hydrocarbons with the fluidized material catalyzes the cracking reaction.

During the cracking reaction, coke will be deposited on the catalyst. Coke is comprised of hydrogen and carbon and can include other materials in trace quantities such as sulfur and metals that enter the process with the starting material. Coke interferes with the catalytic activity of the catalyst by blocking active sites on the catalyst surface where the cracking reactions take place. Catalyst is traditionally transferred from the stripper to the regenerator for purposes of removing the coke by oxidation with an oxygen-containing gas. An inventory of catalyst having a reduced coke content, relative to the catalyst in the stripper, hereinafter referred to as regenerated catalyst, is collected for return to the reaction zone. Oxidizing the coke from the catalyst surface releases a large amount of heat, a portion of which escapes the regenerator with gaseous products of coke oxidation generally referred to as flue gas. The balance of the heat leaves the regenerator with the regenerated catalyst. The fluidized catalyst is continuously circulated from the reaction zone to the regeneration zone and then again to the reaction zone. The fluidized catalyst, as well as providing a catalytic function, acts as a vehicle for the transfer of heat from zone to zone. Catalyst exiting the reaction zone is spoken of as being spent, i.e., partially deactivated by the deposition of coke upon the catalyst. Specific details of the various contact zones, regeneration zones, and stripping zones along with arrangements for conveying the catalyst between the various zones are well known to those skilled in the art.

The rate of conversion of the feedstock within the reaction zone is controlled by regulation of the temperature of the catalyst, activity of the catalyst, quantity of the catalyst (i.e., catalyst to oil ratio) and contact time between the catalyst and feedstock. The most common method of regulating the reaction temperature is by regulating the rate of circulation of catalyst from the regeneration zone to the reaction zone which simultaneously produces a variation in the catalyst to oil ratio as the reaction temperatures change. That is, if it is desired to increase the conversion rate, an increase in the rate of flow of circulating fluid catalyst from the regenerator to the reactor is affected.

The hydrocarbon product of the FCC reaction is recovered in vapor form and transferred to product recovery facilities. These facilities normally comprise a main column for cooling the hydrocarbon vapor from the reactor and recovering a series of heavy cracked products that usually include bottom materials, cycle oil, and heavy gasoline. Lighter materials from the main column enter a concentration section for further separation into additional product streams.

One improvement to FCC units that has reduced product loss caused by thermal cracking is the use of riser cracking. In riser cracking, regenerated catalyst and starting materials enter a pipe reactor and are transported upward by the expansion of the gases that result from the vaporization of the hydrocarbons, and other fluidizing mediums if present, upon contact with the hot catalyst. Riser cracking provides good initial catalyst and oil contact and also allows the time of contact between the catalyst and oil to be more closely controlled by eliminating turbulence and backmixing that can vary the catalyst residence time. An average riser cracking zone today will have a catalyst to oil contact time of 1 to 5 seconds. A number of riser designs use a lift gas as a further means of providing a uniform catalyst flow. Lift gas is used to accelerate catalyst in a first section of the riser before introduction of the feed and thereby reduces the turbulence which can vary the contact time between the catalyst and hydrocarbons.

Riser cracking whether with or without the use of lift gas has provided substantial benefits to the operation of the FCC unit. These can be summarized as a short contact time in the reactor riser to control the degree of cracking that takes place in the riser and improved mixing to give a more homogeneous mixture of catalyst and feed. A more complete distribution prevents different times for the contact between the catalyst and feed over the cross-section of the riser which would otherwise cause some portions of the feed to contact the catalyst for a longer time than other portions of the feed. Both the short contact time and a more uniform average contact time for all of the feed with the catalyst allows overcracking to be controlled or eliminated in the reactor riser.

Unfortunately, much of what can be accomplished in the reactor riser in terms of uniformity of feed contact and controlled contact time can be lost when the catalyst is separated from the hydrocarbon vapors. As the catalyst and hydrocarbons are discharged from the riser, they must be separated. In early riser cracking operations, the output from the riser was discharged into a large vessel. This vessel serves as a disengaging chamber and is still referred to as a reactor vessel, although most of the reaction takes place in the reactor riser. The reactor vessel has a large volume. Vapors that enter the reactor vessel are well mixed in the large volume and therefore have a wide residence time distribution that results in relatively long residence times for a significant portion of the product fraction. Product fractions that encounter extended residence times can undergo additional catalytic and thermal cracking to less desirable lower molecular weight products.

Accordingly, it is desirable to provide apparatuses that efficiently separate catalyst particles from FCC vapor streams. Further, it is desirable to provide apparatuses that accelerate the flow of FCC vapor streams to cause separation of catalyst particles from the streams. Furthermore, other desirable features and characteristics will become apparent from the subsequent detailed description and the appended claims, taken in conjunction with the accompanying drawings and the foregoing technical field and background.

BRIEF SUMMARY

Apparatuses for separating solid catalyst particles from a Fluid Catalytic Cracking (FCC) vapor are provided. In accordance with an exemplary embodiment, an apparatus includes a vessel formed with a vessel wall. A conduit is positioned within the vessel and is configured to direct flow of an FCC vapor-solid stream. The apparatus also includes a channel positioned within the vessel and in fluid communication with the conduit. The channel has a channel inlet with an inlet cross-sectional area and a channel outlet with an outlet cross-sectional area less than about 75% of the inlet cross-sectional area. The channel outlet is configured to direct the vapor-solid stream tangentially toward the vessel wall to separate the solid catalyst particles from the FCC vapor.

In accordance with another exemplary embodiment, an apparatus is provided for separating solid catalyst particles from a Fluid Catalytic Cracking (FCC) vapor. The apparatus includes a conduit defining an axis and configured to direct flow of an FCC vapor-solid stream in an axial direction. Further, the apparatus includes four channels that are in fluid communication with the conduit and are configured to receive the FCC vapor-solid stream. Each channel has a channel inlet with an inlet cross-sectional area and a channel outlet with an outlet cross-sectional area less than about 75% of the respective inlet cross-sectional area. Also, each channel inlet is connected to the conduit, and each channel outlet is configured to direct the vapor-solid stream tangential to the axis.

In accordance with another exemplary embodiment, an apparatus is provided for separating solid catalyst particles from a Fluid Catalytic Cracking (FCC) vapor. The apparatus includes an FCC vessel formed with a vessel wall. Also, the apparatus includes a conduit positioned within the vessel and configured to direct flow of a vapor-solid stream. A channel is positioned within the vessel and includes a channel inlet in fluid communication with the conduit. The channel also includes a channel outlet configured to direct flow of the vapor-solid stream tangentially toward the vessel wall. The channel also includes means for accelerating the flow of the vapor-solid stream out of the channel outlet and for separating the solid catalyst particles from the FCC vapor.

BRIEF DESCRIPTION OF THE DRAWINGS

The methods for evaluating fuel will hereinafter be described in conjunction with the following drawing figures, wherein like numerals denote like elements, and wherein.

DETAILED DESCRIPTION

The following Detailed Description is merely exemplary in nature and is not intended to limit the apparatuses for separating catalytic particles from FCC vapor streams. Furthermore, there is no intention to be bound by any expressed or implied theory presented in the preceding technical field, background or brief summary, or in the following detailed description.

Apparatuses for separating catalyst particles from FCC vapor streams are provided herein. The apparatuses are configured to enhance separation based on the understanding that the relatively low density vapors can flow along a circumferential route while heavier catalyst particles continue along a straight trajectory that is imparted by the apparatuses. Further, catalyst separation efficiency is increased by promoting an accelerated flow of the particle-entrained vapor. The apparatuses are provided on the reactor side of the FCC process and will be useful for most FCC processes that are used to crack light or heavy FCC feedstocks. The apparatuses can be used to modify the operation and arrangement of existing FCC units or can be used in the design of newly constructed FCC units.

Figure 1:
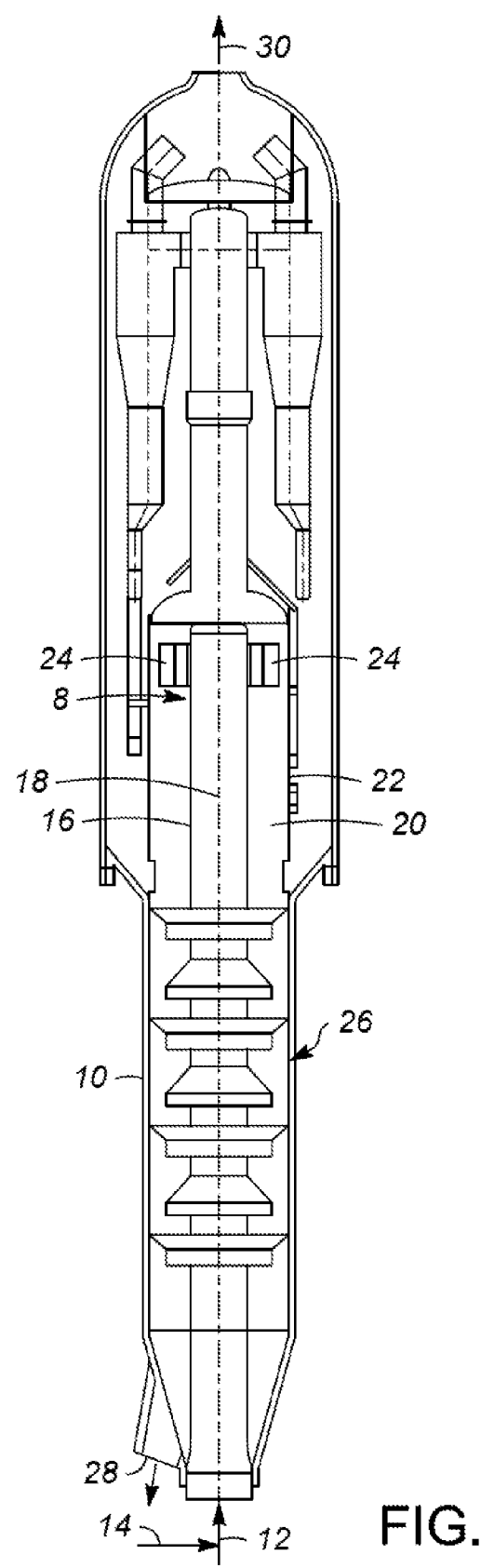
FIG. 1 is a cross-sectional side view of a particle separation apparatus in an FCC riser reactor in accordance with an embodiment herein.

An apparatus 8 for separating catalyst particles from FCC vapor streams is illustrated in FIG. 1. The apparatus 8 is employed alongside the same general elements of many FCC units. As shown, a reactor riser 10 receives an FCC vapor stream 12 that carries or lifts catalyst particles 14 into an inlet 15 of an internal riser conduit 16. The FCC vapor stream 12 is received from a reactor (not shown) within which a hydrocarbon feed was reacted in the presence of a particulate catalyst to form the FCC vapors. The internal riser conduit 16 extends along an axis 18 into a vapor/solid separation (VSS) chamber 20 bounded by a chamber wall 22. The mixture of vapor and catalyst particles flows along the axis 18 to the top of the conduit 16 where the mixture passes into a plurality of channels 24. The channels 24 accelerate the flow of the mixture, as described below, and empty the mixture into the VSS chamber 20. More specifically, the flow of the mixture causes the heavier catalyst particles to contact the wall 22 while the light vapor compounds flow around the cylindrical chamber 20. As a result of the impact, the catalyst particles lose momentum and fall along the wall 22 to a spent catalyst stripper zone 26. In the stripper zone 26, a large percentage of sorbed vapors are removed from the surface of the catalyst particles. The spent catalyst particles are then removed from the reactor riser 10 though outlet 28. While not shown, from outlet 28 the spent catalyst particles are fed to a regeneration zone where they are regenerated. Then, the regenerated catalyst particles may be fed back into the vapor stream 12 as fresh particles 14. After separation from the particles in the VSS chamber 20, the vapor exits the chamber upward and leaves the reactor riser 10 through vapor outlet 30.

Figure 2:
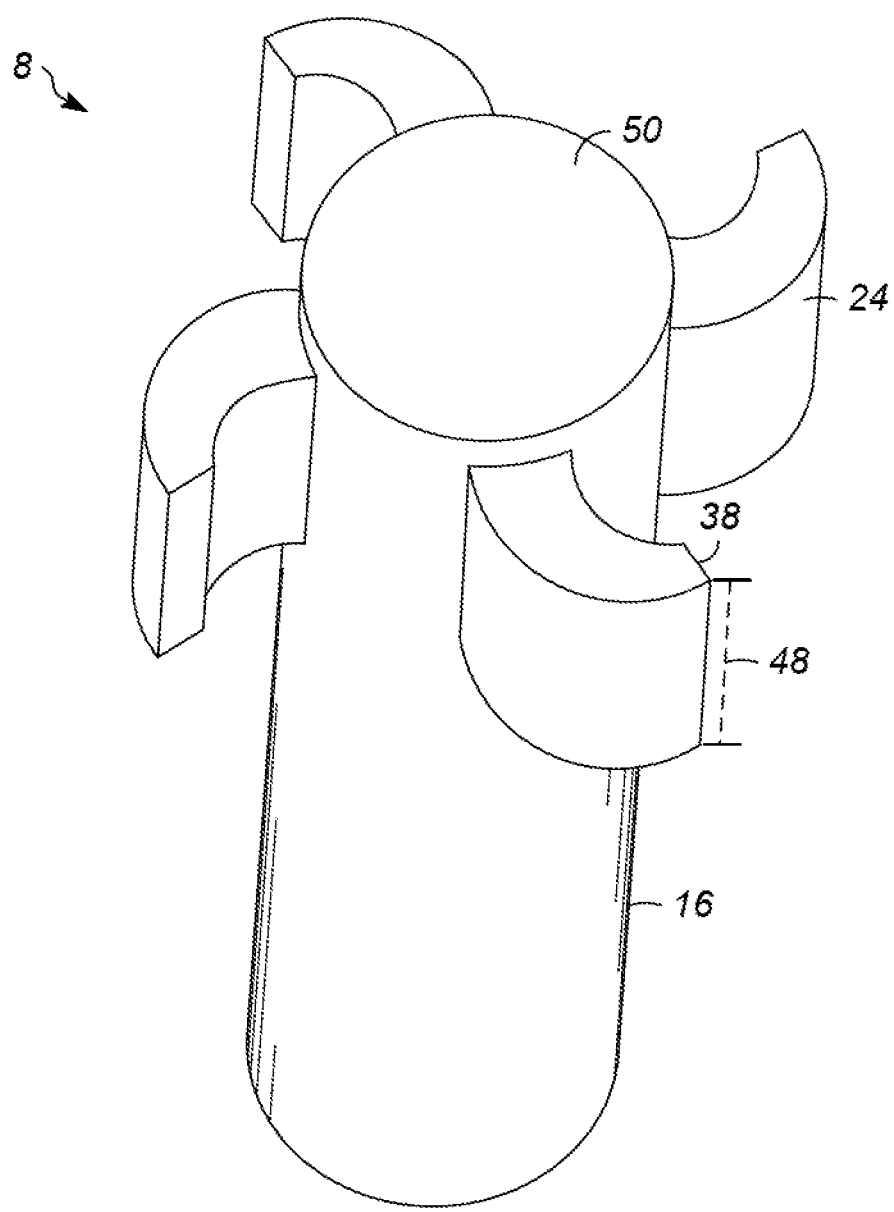
FIG. 2 is a perspective view of the particle separation apparatus of FIG. 1.
Figure 3:
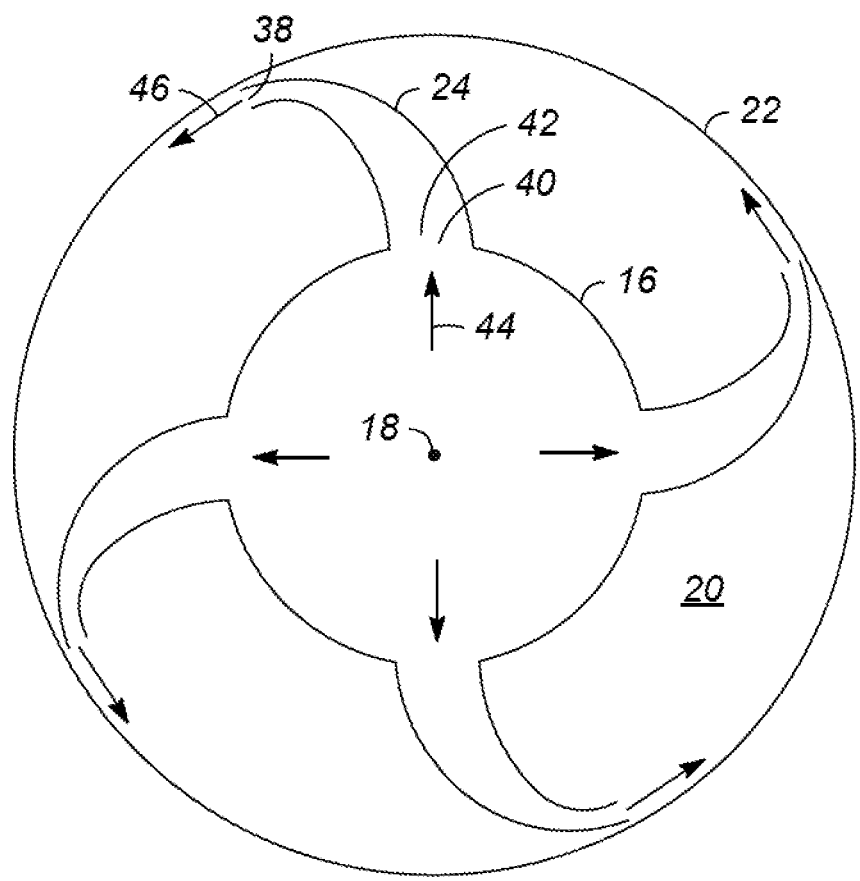
FIG. 3 is a top cross sectional view of the particle separation within a chamber of the FCC riser reactor of FIG. 1.

FIG. 2 is a perspective view of apparatus 8 and FIG. 3 is a top view of apparatus within chamber 20. As shown, the apparatus 8 has a first end 32 closest to the riser inlet 15 and a second end 34 closest to the vapor outlet 30. Further, apparatus 8 is provided with four channels 24 that are mounted to and spaced evenly and circumferentially about the cylindrical conduit 16 and extend to channel outlets 38. While four channels 24 are illustrated, it is contemplated that the apparatus 8 include more or fewer channels. Channels 24 are positioned relative to conduit 16 proximate to second end 34. While illustrated and discussed herein as being separate components, it is contemplated that the conduit 16 and the channels 24 can be integral. As shown in FIG. 3, the conduit 16 is formed with four circumferentially-spaced openings 40. Also, each channel 24 includes an inlet 42 that is in fluid communication with a respective opening 40. Flow of the mixture of vapor and catalyst particles from the conduit 16 into the channels 24 occurs in the radial direction noted by arrows 44. Each inlet 42 has a cross-sectional area perpendicular to the radial direction 44.

As shown in FIG. 3, the channels 24 are arcuate and end at the channel outlets 38. The channel outlets 38 direct flow of the mixture of vapor and catalytic particles in a tangential direction (arrows 46) relative to a circular path about the axis 18. Further, each outlet 38 has a cross-sectional area perpendicular to the tangential direction 46. As indicated by FIG. 3, in an embodiment, the outlet cross-sectional area is less than about 75% of the inlet cross sectional area, for example, less than about 50% of the inlet cross sectional area, such as less than about 33% of the inlet cross sectional area. Further, the cross sectional areas of each channel 24 is reduced gradually from the inlet 42 to the outlet 38. Cross-referencing FIGS. 2 and 3, it is understood that the height 48 of each channel 24 is substantially constant from the inlet 42 to the outlet 38. Therefore, the reduction in cross sectional area is due solely to the decrease in channel width from inlet 42 to outlet 38. According to the principle of the conservation of mass, the reduction of cross sectional flow area is indirectly related to the velocity of the vapor mixture. Further, as the vapor mixture is substantially incompressible, a one-to-one relationship between reduction in flow area and increase in velocity of the vapor mixture may be achieved.

As the increased velocity vapor mixture enters the chamber 20 from each outlet 38, the lighter vapor components of the mixture are more easily able to navigate the circular flow required within the chamber 20. On the other hand, the heavier catalyst particles are unable to navigate the circular path at the higher velocity and instead contact the chamber wall 22. Contact with the wall 22 effectively separates the particles from the vapor due to loss of momentum, and the particles fall along the wall 22 to the catalyst stripper zone 26. Suitable stripping zones for this invention will be any type that can remove adsorbed hydrocarbons from the catalyst. In most cases, the stripping zone will consist of the usual baffle arrangement as shown in FIG. 1 wherein the catalyst particles are contacted countercurrently to an upward flow of stripping steam. As the catalyst particles reach the particle outlet 28, a nozzle withdraws the catalyst particles from the bottom of the stripping zone 26 and transfers them to a catalyst regenerator. An oxygen-containing stream contacts the catalyst in the regenerator and combusts coke from the catalyst thereby producing a flue gas stream of coke combustion by-products removed from the regenerator and providing the regenerated catalyst having a reduced concentration of coke. Any well-known regenerator arrangement for removing coke from the catalyst particles by the combustion of coke and returning catalyst particles to the reactor riser can be used and the particular details of the regeneration zone are not an important aspect of this invention.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the processes without departing from the scope defined by the claims, which includes known equivalents and foreseeable equivalents at the time of filing this patent application.

What is claimed is:

1. An apparatus for separating solid catalyst particles from a Fluid Catalytic Cracking (FCC) vapor comprising:
   a vessel formed with a vessel wall;
   a conduit positioned within the vessel and configured to direct flow of an FCC vapor-solid stream; and
   a channel positioned within the vessel and having a channel inlet with an inlet cross-sectional area and a channel outlet with an outlet cross-sectional area less than about 75% of the inlet cross-sectional area, wherein the channel inlet is in fluid communication with the conduit, and wherein the channel outlet is in direct communication with an open space of the vessel and configured to direct the FCC vapor-solid stream tangentially toward the vessel wall to separate the solid catalyst particles from the FCC vapor.

2. The apparatus of claim 1 wherein the outlet cross-sectional area is less than about 50% of the inlet cross-sectional area.

3. The apparatus of claim 1 wherein the outlet cross-sectional area is less than about 33% of the inlet cross-sectional area.

4. The apparatus of claim 1 wherein the channel inlet and the channel outlet are rectangular, and wherein the channel inlet has an inlet height and the channel outlet has an outlet height substantially equal to the inlet height.

5. The apparatus of claim 1 wherein the channel has gradually decreasing cross-sectional areas from the inlet cross-sectional area to the outlet cross-sectional area.

6. The apparatus of claim 1 wherein the channel is arcuate.

7. The apparatus of claim 6 wherein the channel inlet defines an inlet flow direction, and wherein the channel outlet defines an outlet flow direction transverse to the inlet flow direction.

8. The apparatus of claim 7 wherein the inlet flow direction is substantially radial and the outlet flow direction is substantially tangential.

9. The apparatus of claim 1 wherein the apparatus comprises four channels circumferentially distanced from each other about the conduit.

10. An apparatus for separating solid catalyst particles from a Fluid Catalytic Cracking (FCC) vapor comprising:
    a conduit defining an axis and configured to direct flow of an FCC vapor-solid stream in an axial direction; and
    four channels in fluid communication with the conduit and configured to receive the FCC vapor-solid stream from the conduit, wherein each channel has a channel inlet with an inlet cross-sectional area and a channel outlet with an outlet cross-sectional area less than about 75% of the respective inlet cross-sectional area, wherein each channel inlet is coupled to the conduit, and wherein each channel outlet is configured to direct the vapor-solid stream tangential to the axis.

11. The apparatus of claim 10 wherein each outlet cross-sectional area is less than about 50% of the respective inlet cross-sectional area.

12. The apparatus of claim 10 wherein each outlet cross-sectional area is less than about 33% of the respective inlet cross-sectional area.

13. The apparatus of claim 10 wherein each channel inlet and each channel outlet are rectangular, wherein each channel inlet has an inlet height, and wherein each channel outlet has an outlet height substantially equal to the respective inlet height.

14. The apparatus of claim 10 wherein each channel has gradually decreasing cross-sectional areas from the inlet cross-sectional area to the outlet cross-sectional area.

15. The apparatus of claim 10 wherein each channel is arcuate.

16. The apparatus of claim 15 wherein each channel inlet defines an inlet flow direction, and wherein each channel outlet defines an outlet flow direction transverse to the inlet flow direction of the respective channel.

17. The apparatus of claim 16 wherein the inlet flow direction of each channel is substantially radial and the outlet flow direction of each channel is substantially tangential.

18. The apparatus of claim 10 further comprising a vessel enclosing the conduit and the channels, wherein the vessel formed with a vessel wall, and wherein the each channel outlet is configured to direct the vapor-solid stream tangential about the axis and toward the vessel wall to separate the solid catalyst particles from the FCC vapor.

19. An apparatus for separating solid catalyst particles from a Fluid Catalytic Cracking (FCC) vapor comprising:
an FCC vessel formed with a vessel wall;
a conduit configured to direct flow of a vapor-solid stream, wherein the conduit is positioned within the vessel;
a channel positioned within the vessel and having a channel inlet in fluid communication with the conduit and a channel outlet configured to direct flow of the vapor-solid stream tangentially toward the vessel wall, wherein the channel includes means for accelerating the flow of the vapor-solid stream out of the channel outlet and for separating the solid catalyst particles from the FCC vapor, wherein the channel inlet has an inlet height and the channel outlet has an outlet height substantially equal to the inlet height.

20. The apparatus of claim 19 wherein four channels are positioned within the vessel with channel inlets in fluid communication with the conduit and channel outlets configured to direct flow of the vapor-solid stream tangentially toward the vessel wall, wherein the channel inlets are circumferentially spaced about the conduit.

* * * * *